US008424431B1

(12) United States Patent
Jackman et al.

(10) Patent No.: US 8,424,431 B1
(45) Date of Patent: Apr. 23, 2013

(54) PAPER TOWELING DISPENSER WITH SPRING BIASED TOWELING SUPPORT DRUM

(75) Inventors: Andrew Jackman, Langley (CA); Alex Trampolski, Richmond (CA)

(73) Assignee: Dispensing Dynamics International, City of Industry, CA (US)

(*) Notice: Subject to any disclaimer, the term of this patent is extended or adjusted under 35 U.S.C. 154(b) by 376 days.

(21) Appl. No.: 12/928,045

(22) Filed: Dec. 2, 2010

(51) Int. Cl.
*B23D 25/12* (2006.01)

(52) U.S. Cl.
USPC .................................... 83/343; 83/649

(58) Field of Classification Search .................... 83/649, 83/949; 225/23, 65, 26, 106, 39, 121, 87; 226/121
See application file for complete search history.

(56) References Cited

U.S. PATENT DOCUMENTS

| | | | | |
|---|---|---|---|---|
| 2,186,798 | A * | 1/1940 | Birr | 226/121 |
| 2,369,851 | A * | 2/1945 | Price et al. | 226/121 |
| 5,441,189 | A * | 8/1995 | Formon et al. | 225/2 |
| 6,196,102 | B1 * | 3/2001 | Granger | 83/335 |
| 6,224,010 | B1 * | 5/2001 | Morand | 242/564.4 |
| 6,237,871 | B1 * | 5/2001 | Morand et al. | 242/564.2 |
| 6,553,879 | B2 * | 4/2003 | Morand | 83/37 |
| 6,684,751 | B2 * | 2/2004 | Kapiloff et al. | 83/649 |
| 6,997,094 | B2 * | 2/2006 | Granger | 83/649 |
| 7,357,348 | B2 * | 4/2008 | Kananen | 242/564.2 |
| 8,146,471 | B2 * | 4/2012 | Hansen et al. | 83/337 |

* cited by examiner

*Primary Examiner* — Andrea Wellington
*Assistant Examiner* — Fernando Ayala
(74) *Attorney, Agent, or Firm* — Thomas R. Lampe

(57) ABSTRACT

A spring is utilized to exert variable tensional forces on a toweling support drum of a paper toweling dispenser. The spring is connected between a drum and a sliding spring mount which enables a long toweling tail to be presented externally of the dispenser.

12 Claims, 4 Drawing Sheets

14
18
40
44
42
30
20
24
26

20
24
26
28
18
22
62
30
14
40

20
18
24
26
22
28
62
30
14
40

18
14
26
20
44
40
30
42
24

62
20
18
24
60
26
28
22
30
14
40

PAPER TOWELING DISPENSER WITH SPRING BIASED TOWELING SUPPORT DRUM

TECHNICAL FIELD

This invention relates to apparatus for dispensing paper toweling having a tail from a roll of paper toweling. More particularly, the apparatus utilizes a spring associated with a toweling support drum to alternatively resist rotation of the support drum and cause rotation of the support drum during a dispensing cycle.

BACKGROUND OF THE INVENTION

It is well known to employ coil tension springs in association with paper toweling support drums to influence rotation of the drums during operation of a paper toweling dispenser. Typically, the tension of such springs increases during an initial phase of the dispenser operation, generally effected by a user pulling on the toweling or utilizing actuator mechanism to rotate the drum. At a certain point in the operation the tensioned spring begins to promote rotation of the drum, for example for the purpose of delivering a tail externally of the dispenser housing. Conventionally, the spring end not connected to the drum is fixed in place.

Prior art arrangements can have one or both of the following drawbacks. A presented tail projecting from the dispenser can be short, resulting in "tabbing" of the tail when pulled or otherwise creating a condition detrimental to dispensing of the toweling. Also, the spring/toweling support drum combination may unduly increase the pull force required to effect dispensing or cause toweling cutting action.

DISCLOSURE OF INVENTION

The present invention incorporates structural elements which cooperate to present a relatively long paper tail without adversely affecting the pull force or cutting action.

The invention is characterized by its simplicity, effectiveness, reliability, and relative low cost.

The invention includes a dispenser housing defining an interior and a paper toweling exit opening in communication with the housing interior.

A rotatable, elongated toweling support drum is within the housing interior for receiving and supporting paper toweling extending from a roll of paper toweling in the housing interior and for transporting the paper toweling toward the toweling exit opening upon rotation of the toweling support drum about an axis of rotation.

The apparatus includes a spring having first and second spring ends. The first spring end is connected to an end of the toweling support drum at a location offset from the axis of rotation of the toweling support drum.

Additionally included in the paper towel dispensing apparatus is a spring mount movable relative to the toweling support drum along a predetermined path of movement. The second spring end is attached to the spring mount.

The spring exerts variable tensional forces on the toweling support drum either resisting rotational movement of the toweling support drum or promoting rotational movement of the toweling support drum.

The spring mount is movable relative to the toweling support drum along the predetermined path of movement responsive to rotational movement of the toweling support drum.

Other features, advantages and objects of the present invention will become apparent with reference to the following description and accompanying drawings.

BEST MODE FOR CARRYING OUT THE INVENTION

Figure 1:
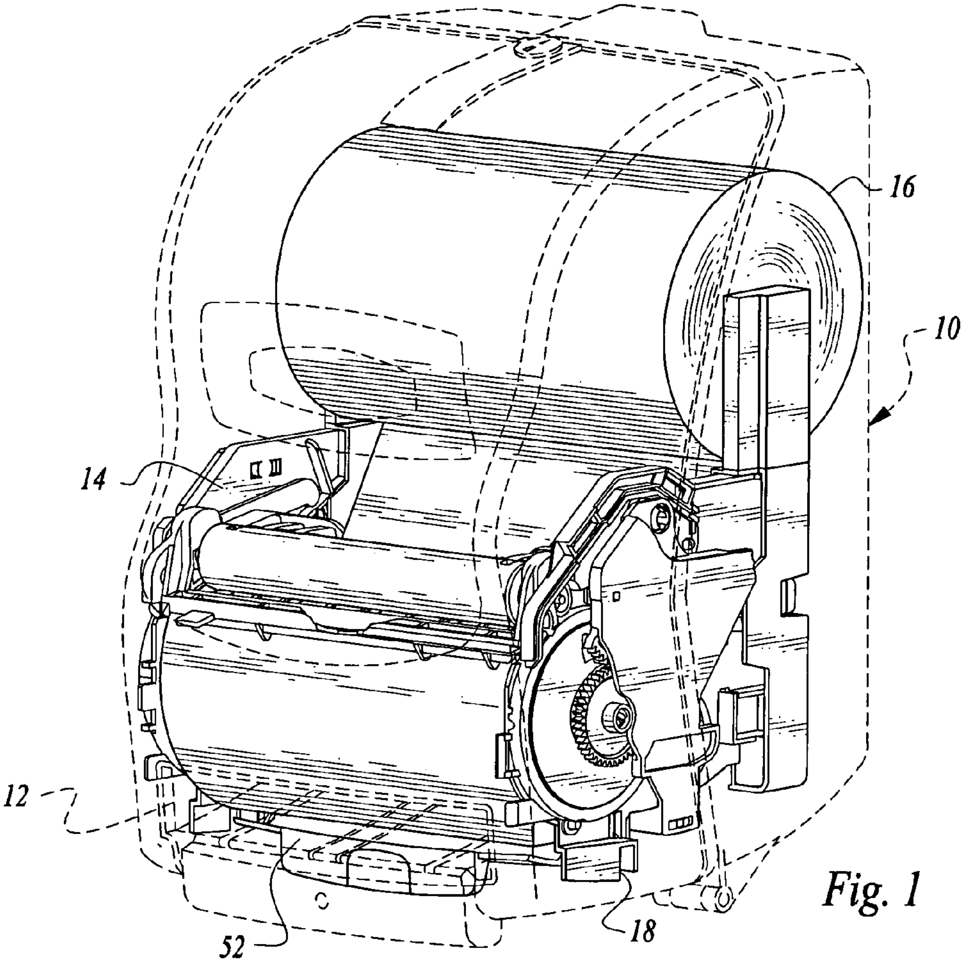
FIG. 1 is a perspective view illustrating dispenser apparatus constructed in accordance with the teachings of the present invention, the housing of the dispenser apparatus being shown in broken lines, and a roll of paper toweling supported by a chassis within the housing.
Figure 2:
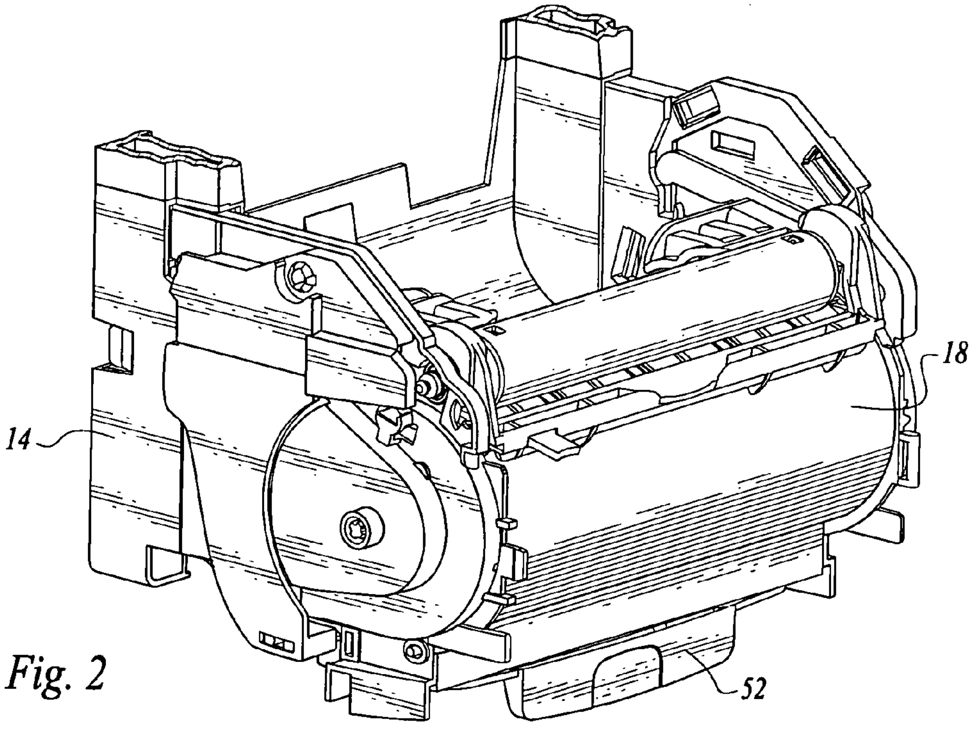
FIG. 2 is an enlarged, perspective view illustrating the left side of a portion of the chassis, a toweling support drum and related structure.

Referring now to the drawings, apparatus for dispensing paper toweling from a roll of paper toweling constructed in accordance with the teachings of the present invention is illustrated.

The apparatus includes a dispenser housing 10 (shown in dash lines in FIG. 1) defining an interior and a paper toweling exit opening 12 at the front of the housing.

Disposed within the interior of the housing 10 is a chassis 14. Rotatably mounted on chassis 14 is a roll 16 of paper toweling. Also rotatably supported by chassis 14 is a rotatable, elongated toweling support drum 18 which receives and supports paper toweling 20 which extends from the roll 16. As will be described in detail below, the toweling support drum 18 transports the paper toweling toward the toweling exit opening 12 upon rotation of the toweling support drum about a central axis of rotation.

A coil tension spring 22 is connected at one end thereof to an end 24 of the toweling support drum at a location offset from the axis of rotation of the toweling support drum. More particularly, the spring 22 is rotatably connected to a projection 26 extending outwardly from toweling support drum end 24. A spring connector 28 is rotatably mounted on the projection 26 and rotatably connects the spring to the projection.

A spring mount 30 within the dispenser housing is movable relative to the toweling support drum along a predetermined path of movement. The end of the spring 22 opposed to the spring end attached to the toweling support drum is attached to the spring mount. As described in greater detail below, the spring exerts variable tensional forces on the toweling support drum alternatively either resisting rotational movement of the toweling support drum or causing rotational movement of the toweling support drum along the predetermined path of movement responsive to rotational movement of the toweling support drum.

The predetermined path of movement is defined by a guide structure or track 40 on chassis 14. The guide structure is adjacent to end 24 of the toweling support drum and the path of movement defined thereby is orthogonal to the axis of rotation of the toweling support drum.

The spring mount 30 includes a mount body 42 attached to the spring 22 externally of the guide structure 40. A roller 44 is connected to the mount body and positioned in the guide structure to facilitate slidable movement of the spring mount relative to the guide structure.

Figure 13:
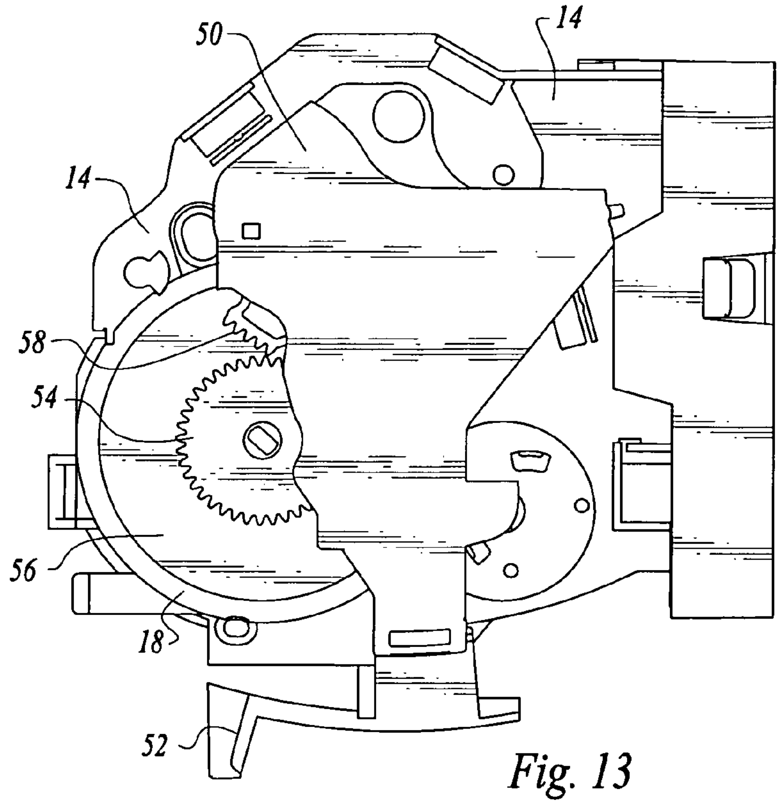
FIG. 13 is a right side, elevational view of the chassis and illustrating an end of the toweling support drum and an actuator, the actuator and drum having gear teeth which engage to initiate dispensing by the apparatus.
Figure 14:
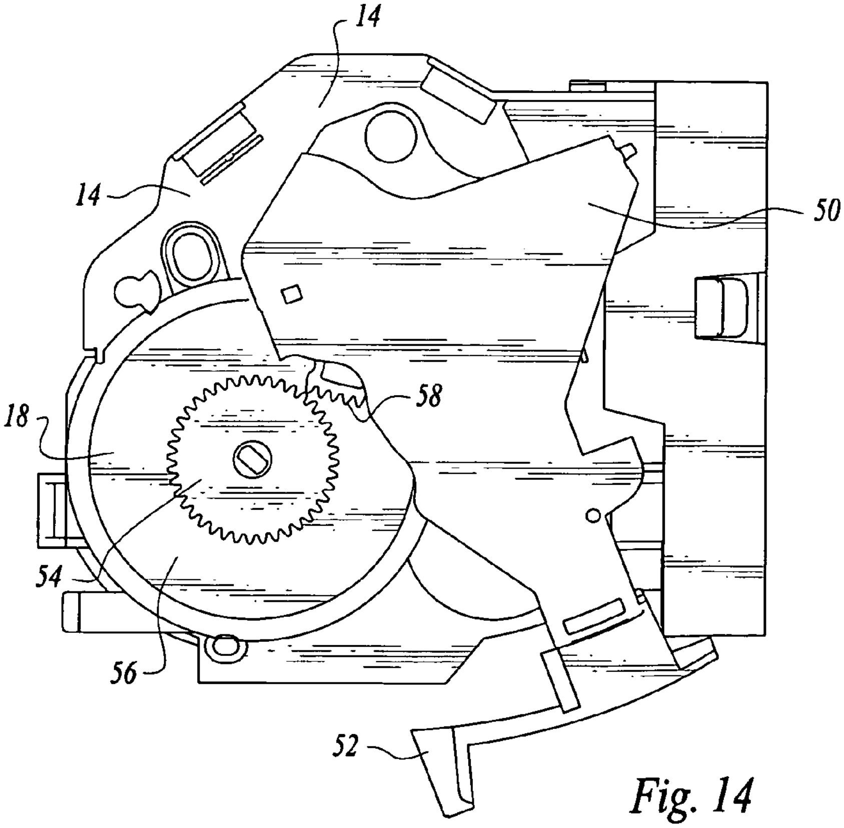
FIG. 14 is a view similar to FIG. 13, but illustrating the actuator having been manually displaced and after the gear teeth have rotated to initiate dispensing.

An actuator 50 is pivotally mounted on the chassis 14 and movable between a first position (shown in FIG. 13) and a second position (shown in FIG. 14). The actuator includes a manually engageable push bar 52 extending from the bottom of the chassis and housing. A circular gear 54 having gear teeth about the periphery thereof is located at the end 56 of the toweling support drum, that is, the end opposed to end 24 thereof. Actuator 50 includes a gear segment 58 having gear teeth.

Movement of the actuator from the position shown in FIG. 13 to the position shown in FIG. 14 causes rotation of the toweling support drum and transport of toweling supported by the toweling support drum.

Spring 22 initially resists rotation of the toweling support drum and is increasingly tensioned during movement of the actuator from the first position to the second position and during this phase of dispensing resists rotational movement of the toweling support drum. However, after the actuator moves beyond the second position thereof shown in FIG. 14, spring 22 promotes rotation of the toweling support drum and tension thereof decreases until the support drum returns to its initial or rest position. The actuator, including push bar 52, returns to its first position as shown in FIG. 13 once the user has stopped pushing on the push bar 52. This could be due to bias exerted by a separate actuator return spring (not shown) associated with the actuator. A one-way clutch (not shown) may be employed between the drum 18 and gear 54 to allow return of the actuator without interfering with rotation of the drum.

The elongated spring 22 has a spring axis which changes position during rotation of the toweling support drum. An important aspect of this invention is that the spring mount 30 during rotation of the toweling support drum slides to follow the spring axis.

Figure 3:
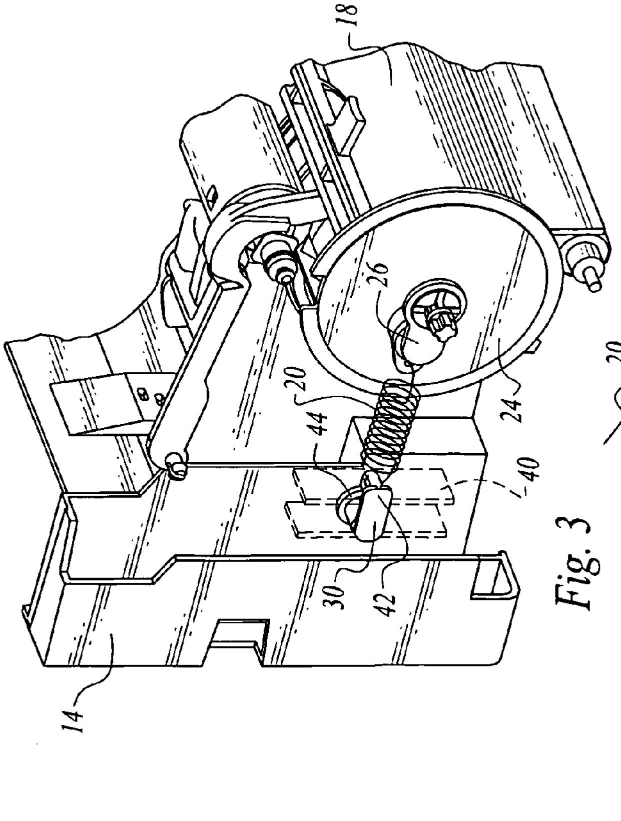
FIG. 3 is an enlarged, perspective view illustrating portions of the chassis and support drum, a slide and slide mount operatively associated with an end of the drum shown in the positions assumed thereby when the drum is at rest.
Figure 4:
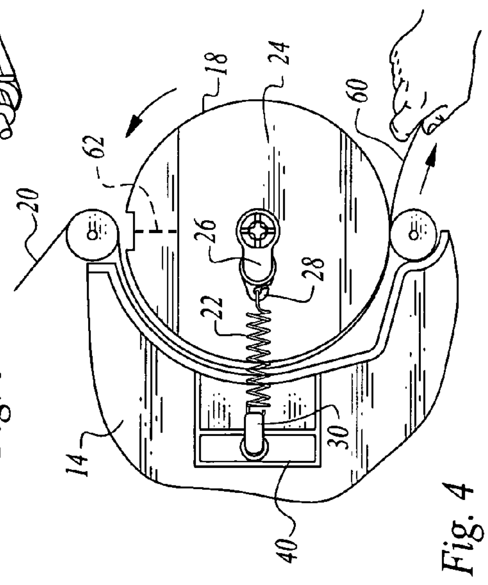
FIG. 4 is a side, elevational view showing the drum, spring and spring mount in the positions illustrated in FIG. 3 with a tail of the toweling supported by the drum prior to rotation of the drum directed toward the hand of an individual.

FIGS. 3 and 4 show the drum 18 in its normal rest position. Spring 20 and spring mount 30 are also in their at rest positions. When the consumer wishes to dispense toweling, the push bar is pushed, extending the tail 60 of the toweling to a hand of the user as shown in FIG. 4.

Figure 5:
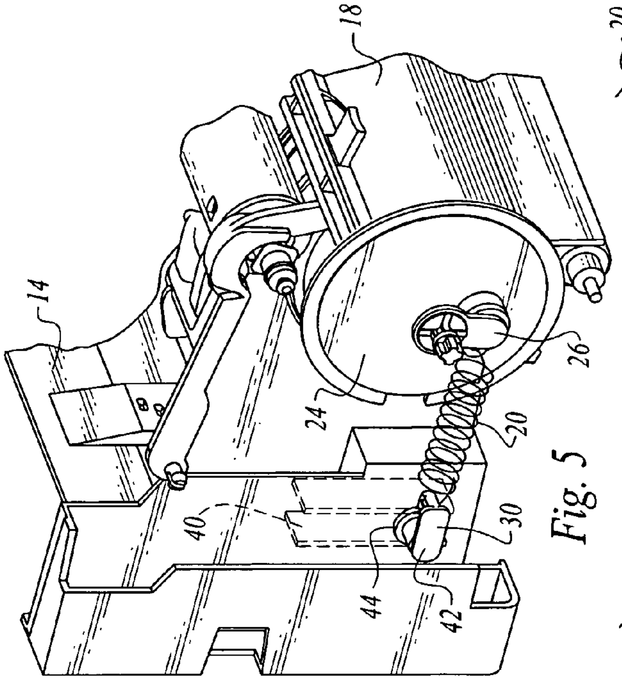
FIG. 5 is a view similar to FIG. 3, but illustrating positioning of the drum, the spring and the spring mount after rotation of the drum has been initiated and toweling is being dispensed.
Figure 6:
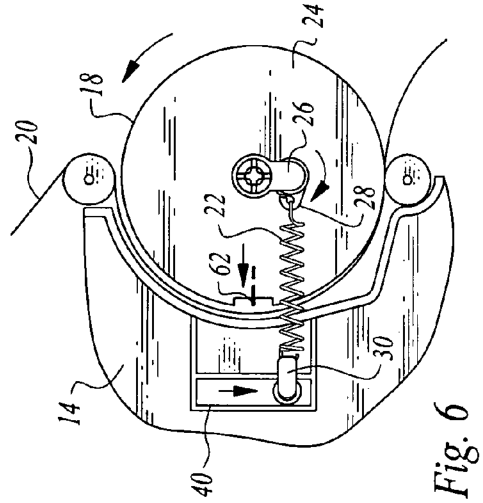
FIG. 6 is a view similar to FIG. 5, but illustrating the relative positions of the drum, spring and spring mount during the stage of operation shown in FIG. 5.

Continued pushing of the push bar to move the actuator 50 from the position shown in FIG. 13 to FIG. 14 will cause the drum, spring and spring mount to move to their respective positions shown in FIGS. 5 and 6.

In the disclosed embodiment, the drum 18 is a toweling cutting drum and it may also be seen that a cutter blade 62 associated with the drum moves outwardly relative to the drum as the drum rotates. This can be accomplished by utilizing any suitable well known prior art approach, such as the use of a cam and a cam follower actuator associated with the blade. Since such mechanisms are well known and not a part of the present invention, it has not been illustrated.

Figure 7:
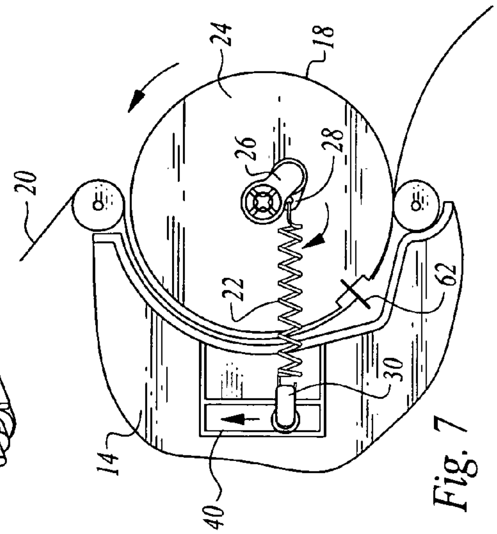
FIG. 7 is a view similar to FIG. 6, but illustrating the relative positions of the drum, spring and spring mount after severing of the toweling by a cutter blade on the drum.

FIG. 7 shows continued rotational movement of the drum as the actuator 50 approaches the FIG. 14 position. It will be noted that the spring mount will have reversed its direction of movement in the guide structure at this stage of operation and that the cutting blade 62 has been maximally extended to sever the toweling.

Figure 10:
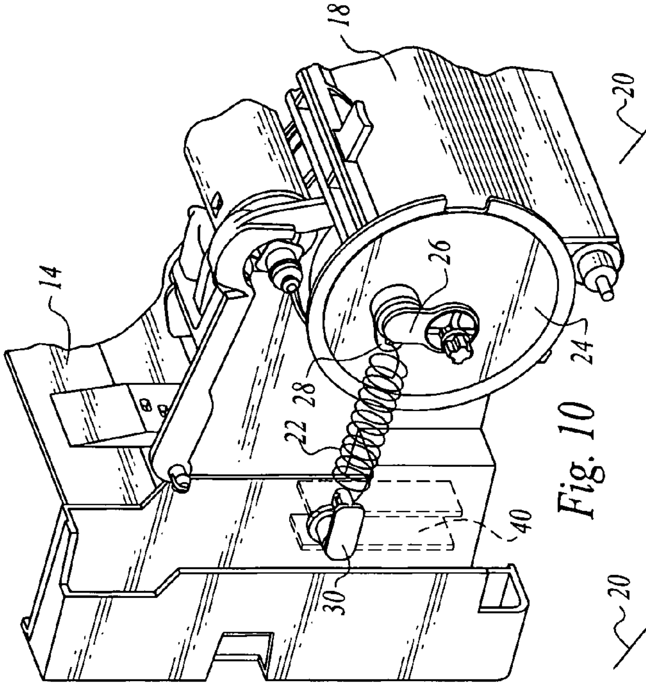
FIG. 10 is a view similar to FIG. 8, but showing the spring promoting rotation of the drum.
Figure 12:
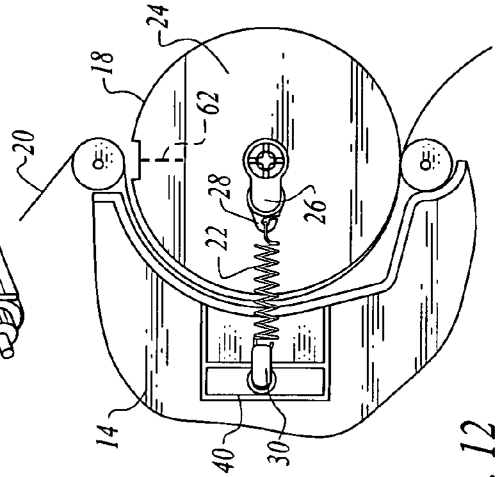
FIG. 12 shows the drum, the spring and the spring mount in the same relative positions shown in FIG. 4, which is the rest or non-operating stage of the dispenser.
Figure 11:
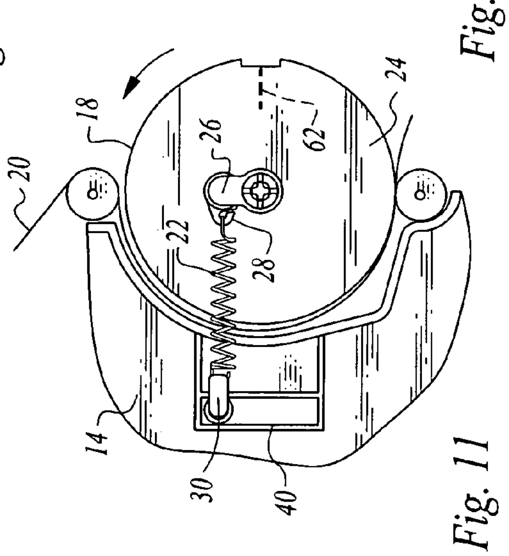
FIG. 11 is a view similar to FIGS. 4, 6, 7 and 9 showing the drum, spring and spring mount in the relative positions shown in FIG. 10.
Figure 8:
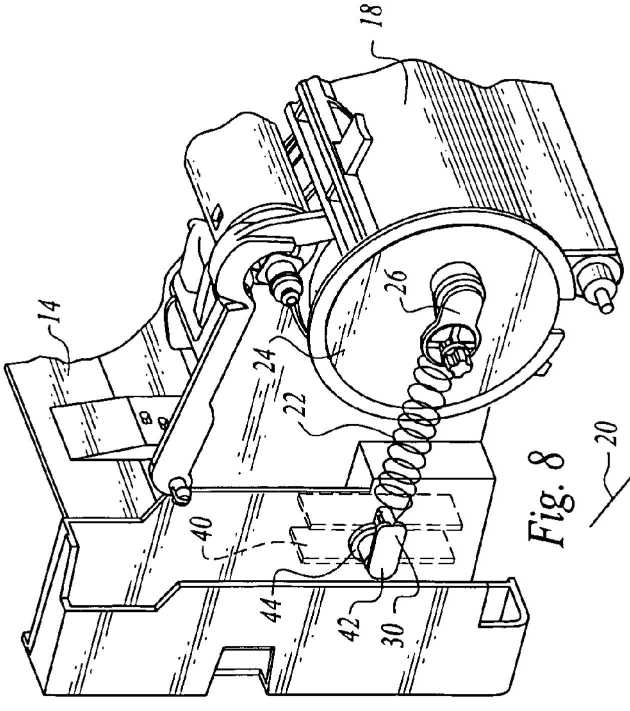
FIG. 8 is a view similar to FIGS. 3 and 5, but illustrating the relative positions of the drum, the spring and spring mount at the point of operation wherein the drum has been rotated to a position 180 degrees from the position illustrated in FIG. 3 during the dispensing process.
Figure 9:
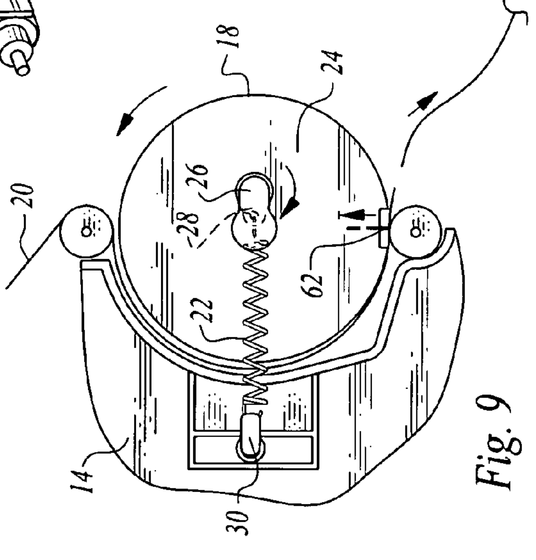
FIG. 9 is a view similar to FIGS. 4, 6 and 7, but illustrating the relative positions of the drum, spring and spring mount as shown in FIG. 8 and just prior to the spring promoting, rather than resisting, rotation of the drum.

FIGS. 8 and 9 show the condition of the drum, the spring and the spring mount when the actuator 50 is at its FIG. 14 position. At this point, the spring 22, rather than resisting rotational movement of the towel support drum, will promote rotation of the toweling support drum. The blade 62 retracts and the force of the tensioned spring causes the drum to rotate through the stage indicated in FIGS. 10 and 11 to the initial or rest stage of the drum, the spring and the spring mount, this latter stage being shown in FIG. 12 as well as in FIG. 4.

It should be noted that at all times the spring mount during rotation of the toweling support drum slides to follow the axis of spring 22. This feature enables the dispenser apparatus to present a longer paper tail without adversely affecting the pull force or cutting action of the apparatus.

The invention claimed is:

1. Apparatus for dispensing paper toweling from a roll of paper toweling, said apparatus comprising, in combination:

a dispenser housing defining an interior and a paper toweling exit opening in communication with said housing interior;

a rotatable, elongated toweling support drum within said housing interior for receiving and supporting paper toweling extending from a roll of paper toweling in said housing interior and for transporting said paper toweling toward said toweling exit opening upon rotation of the toweling support drum about an axis of rotation;

a spring having first and second spring ends, said first spring end connected to an end of said toweling support drum at a location offset from the axis of rotation of said toweling support drum; and a spring mount within said dispenser housing movable relative to said toweling support drum along a predetermined path of movement, said second spring end attached to said spring mount, said spring exerting variable tensional forces on said toweling support drum alternatively either resisting rotational movement of said toweling support drum or promoting rotational movement of said toweling support drum, said spring mount movable relative to said toweling support drum along said predetermined path of movement responsive to rotational movement of said toweling support drum.

2. The apparatus according to claim 1 wherein said spring is a coil tension spring.

3. The apparatus according to claim 2 including a projection extending outwardly from said end of the toweling support drum, said first spring end being rotatably connected to said projection.

4. The apparatus according to claim 3 including a spring connector rotatably mounted on said projection and rotatably connecting said first spring end to said projection.

5. The apparatus according to claim 1 additionally including guide structure defining the predetermined path of movement.

6. The apparatus according to claim 5 wherein said spring mount is slidably movable relative to said guide structure.

7. The apparatus according to claim 6 wherein said guide structure is adjacent to said end of the toweling support drum and wherein the predetermined path of movement extends generally orthogonally to the axis of rotation of said toweling support drum.

8. The apparatus according to claim 7 wherein said spring mount includes a mount body attached to said second spring end externally of said guide structure and a roller connected to said mount body positioned in said guide structure.

9. The apparatus according to claim 1 wherein said toweling support drum is a toweling cutting drum including a toweling cutter blade.

10. The apparatus according to claim 1 additionally comprising an actuator operably associated with said toweling support drum and movable between first and second positions, movement of the actuator from said first position to said second position causing rotation of said toweling support drum and transport of toweling supported by said toweling support drum, said spring resisting rotation of said toweling support drum and being increasingly tensioned during movement of said actuator from said first position to said second position, and said spring applying forces to said toweling support drum promoting rotation of said toweling support drum after said actuator moves to said second position.

11. The apparatus according to claim 10 wherein said actuator and said toweling support drum include gear teeth engaging when said actuator moves from said first position to said second position.

12. The apparatus according to claim 1 wherein said spring has a spring axis, the position of said spring axis changing during rotation of said toweling support drum, and said spring mount during rotation of said toweling support drum sliding to follow the spring axis.

* * * * *